(12) United States Patent
Maguin

(10) Patent No.: US 11,639,679 B2
(45) Date of Patent: May 2, 2023

(54) DYNAMIC MONITORING OF THE FLOW RATE OF LIQUID ADDITIVE INJECTED INTO A MOTOR VEHICLE EXHAUST GAS TREATMENT SYSTEM

(71) Applicant: VITESCO TECHNOLOGIES GmbH, Hanover (DE)

(72) Inventor: Georges Maguin, Toulouse (FR)

(73) Assignee: ACTBLUE EUROPE S.A R.L., Senningerberg (LU)

( * ) Notice: Subject to any disclaimer, the term of this patent is extended or adjusted under 35 U.S.C. 154(b) by 11 days.

(21) Appl. No.: 17/053,123

(22) PCT Filed: Feb. 22, 2019

(86) PCT No.: PCT/FR2019/050417
§ 371 (c)(1),
(2) Date: Nov. 5, 2020

(87) PCT Pub. No.: WO2019/215398
PCT Pub. Date: Nov. 14, 2019

(65) Prior Publication Data
US 2021/0239021 A1      Aug. 5, 2021

(30) Foreign Application Priority Data

May 11, 2018   (FR) ...................................... 1853977

(51) Int. Cl.
*F01N 3/20*     (2006.01)
*B60Q 9/00*    (2006.01)

(52) U.S. Cl.
CPC ............... *F01N 3/208* (2013.01); *B60Q 9/00* (2013.01); *F01N 2610/144* (2013.01);
(Continued)

(58) Field of Classification Search
CPC ....... B60Q 9/00; F01N 11/00; F01N 2550/05; F01N 2560/08; F01N 2610/02;
(Continued)

(56) References Cited

U.S. PATENT DOCUMENTS 8,671,663 B2   3/2014   Buerglin et al.
9,599,003 B2   3/2017   Hodgson et al.
(Continued)

FOREIGN PATENT DOCUMENTS

CN   101405489 A   4/2009
CN   104583552 A   4/2015
(Continued)

OTHER PUBLICATIONS

International Search Report for PCT/FR2019/050417 dated May 31, 2019, 6 pages.
(Continued)

*Primary Examiner* — Phutthiwat Wongwian
*Assistant Examiner* — Diem T Tran
(74) *Attorney, Agent, or Firm* — Nixon & Vanderhye

(57) ABSTRACT

Disclosed is a process for the dynamic monitoring of the flow rate of liquid additive consumed by a liquid-additive injector of an exhaust gas treatment system of a motor vehicle. The measurement of the pressure of the liquid makes it possible firstly to deduce the flow rate circulating through the orifice and secondly, by knowing the operating characteristic of the pump, to determine the flow rate of liquid additive actually delivered to the system for treating polluting gases. The process also provides a phase of characterizing the pump, including commanding the closure of the injector, measuring at least two pressure values for two different operating speeds of the pump, and updating the pump operating characteristics table on the basis of the pressure values measured.

20 Claims, 3 Drawing Sheets

(52) U.S. Cl.
CPC  *F01N 2610/1406* (2013.01); *F01N 2610/148* (2013.01); *F01N 2610/1426* (2013.01); *F01N 2610/1453* (2013.01); *F01N 2900/0416* (2013.01); *F01N 2900/1808* (2013.01); *F01N 2900/1812* (2013.01); *F01N 2900/1821* (2013.01)

(58) Field of Classification Search
CPC ..... F01N 2610/1406; F01N 2610/1426; F01N 2610/1433; F01N 2610/144; F01N 2610/1453; F01N 2610/146; F01N 2610/148; F01N 2900/0416; F01N 2900/1806; F01N 2900/1808; F01N 2900/1812; F01N 2900/1821; F01N 2900/1822; F01N 3/2066; F01N 3/208; F01N 9/00; Y02A 50/20; Y02T 10/12; Y02T 10/40

See application file for complete search history.

(56) References Cited

U.S. PATENT DOCUMENTS

| | | |
|---|---|---|
| 9,677,444 B2 | 6/2017 | Dea et al. |
| 2013/0180323 A1 | 7/2013 | Peucat et al. |
| 2014/0260216 A1* | 9/2014 | Everard .................. F01N 3/208 60/301 |
| 2017/0022927 A1* | 1/2017 | Sanborn .................. F02D 41/26 |
| 2018/0066598 A1* | 3/2018 | Dusa ...................... F02D 41/064 |
| 2018/0149058 A1* | 5/2018 | Hudson .................... F01N 9/00 |

FOREIGN PATENT DOCUMENTS

| | | |
|---|---|---|
| CN | 205936757 U | 2/2017 |
| DE | 10 2011 075 298 | 11/2012 |
| DE | 10 2012 218 851 | 4/2014 |
| DE | 10 2016 114 862 | 2/2017 |
| WO | 2007/112856 A1 | 10/2007 |
| WO | 2008006840 | 1/2008 |

OTHER PUBLICATIONS

Written Opinion of the ISA for PCT/FR2019/050417 dated May 31, 2019, 6 pages.

Office Action issued in Chinese Patent Application No. 201980031530.3 dated Nov. 23, 2021.

\* cited by examiner

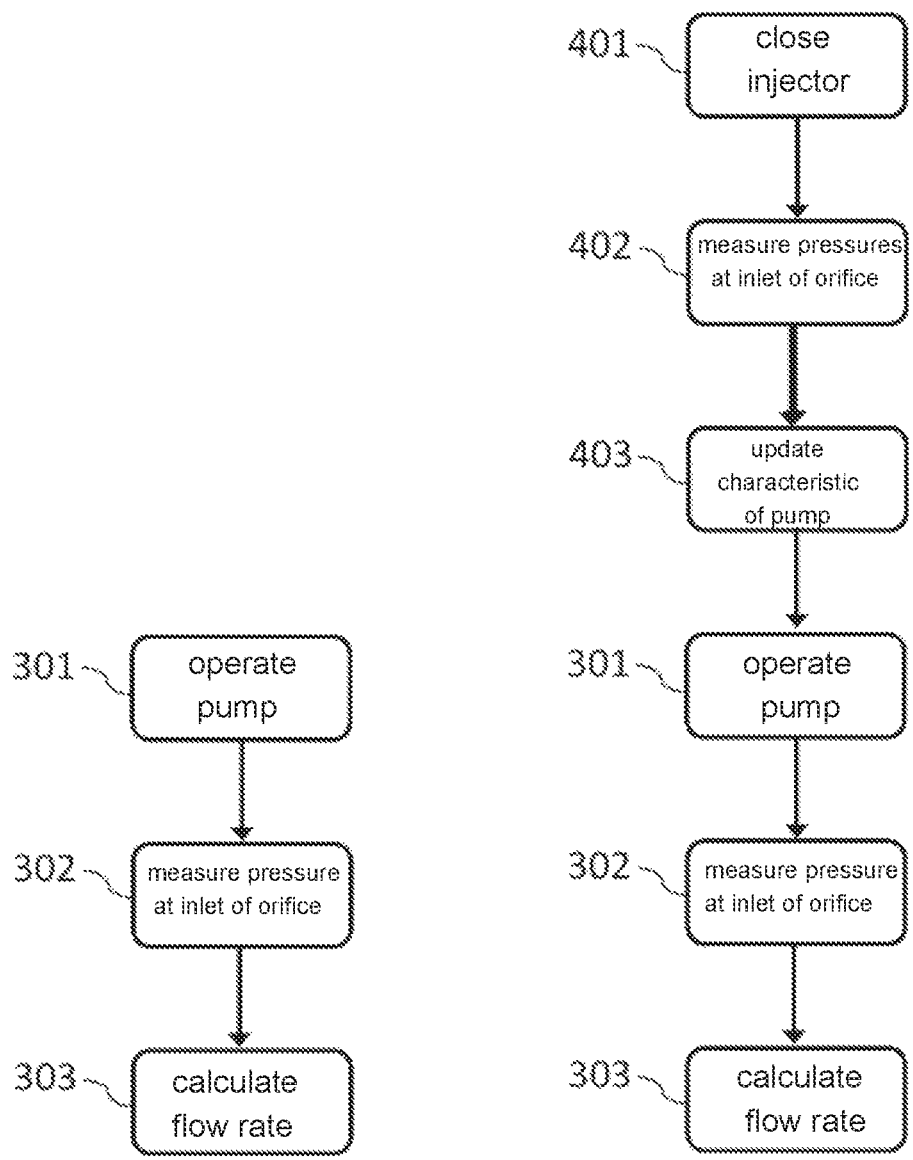

DYNAMIC MONITORING OF THE FLOW RATE OF LIQUID ADDITIVE INJECTED INTO A MOTOR VEHICLE EXHAUST GAS TREATMENT SYSTEM

BACKGROUND OF THE INVENTION

Field of the Invention

The present invention relates generally to exhaust gas treatment systems of motor vehicles.

It relates more particularly to the dynamic monitoring of the flow rate of liquid additive injected into the exhaust gas treatment system of a motor vehicle, such as a selective catalytic reduction treatment system.

The invention finds applications, in particular, in vehicles equipped with diesel engines, for example light-duty vehicles, utility-type vehicles or in trucks (or heavy-duty vehicles) having such an engine.

Description of the Related Art

The exhaust gases generated by vehicles having compression-ignition engines (known as diesel engines) or by vehicles having controlled-ignition engines (known as gasoline engines) are made up in particular of gaseous atmospheric pollutants such as carbon oxides (COx, used for CO and $CO_2$) and nitrogen oxides (NOx, used for NO and $NO_2$). Diesel engines, in particular, are subject to regulations aimed at reducing the amount of polluting gases that they emit. Standards for limiting the levels of nitrogen oxides emitted are an example thereof, and tend to be increasingly restrictive.

In the case of vehicles equipped with a diesel engine, where this is already the case, and in the case of vehicles equipped with a gasoline engine, where this could become the case in the near future, the decontamination of the exhaust gases of the engine may be effected by means of a gas treatment system implementing a decontamination method such as the SCR ("selective catalytic reduction") method. The SCR method employs a decontaminating liquid additive in order to selectively reduce the nitrogen oxides (NOx) contained in the exhaust gases. A decontaminating liquid additive is understood to be a decontaminating product that can be injected into an exhaust gas treatment device of an engine in order to decontaminate the exhaust gases before they are emitted into the atmosphere.

The liquid additive commonly used in the SCR method is known as DEF or "diesel exhaust fluid". This additive is a 32.5% (by mass) aqueous solution of urea, also sold under the trade name AdBlue®, which is an ammonia ($NH_3$) precursor. In this context, the thermal energy provided by the exhaust is a catalyst for converting DEF into ammonia. The ammonia reacts with the nitrogen oxides (NOx) of the exhaust gases to produce less polluting types, namely nitrogen ($N_2$), water and carbon dioxide ($CO_2$). Thus, the ammonia used in the SCR method is a reducing agent, provided in the form of a liquid additive.

In vehicles equipped with an exhaust gas treatment system, the liquid additive is generally stored in a dedicated tank. It is withdrawn therefrom by a pump, which causes it to circulate, at a particular flow rate, in a hydraulic circuit as far as an injector. This injector has the function of spraying the appropriate amount of additive, in the form of microdroplets, into the flow of exhaust gases at each moment under the control of a control unit. This control unit has the function of metering the amount of additive to be injected depending on the actual needs of the exhaust gas treatment system, and of consequently controlling the injector depending for example on parameters such as the temperature of the liquid additive or the hydraulic pressure at a given moment.

On account in particular of the many changes that can occur when a motor vehicle is being driven (variation in speed and/or acceleration of the vehicle, variation in engine torque, etc.), rapid and large-amplitude variations arise in general in the production of polluting gases. Hence, and in order to treat them effectively, the amount of liquid additive to be injected into the gas treatment system has to be adapted dynamically and has to cover relatively large amplitudes of values.

Furthermore, the use of the exhaust gas treatment systems in a motor vehicle is legally very limited. In particular, standards specify in particular that the flow rate of liquid additive actually delivered to the exhaust gas treatment system (of the SCR type) should be known in real time. More specifically, it is a matter of being capable of ensuring that there is no significant difference between the amount of additive theoretically injected into the flow of exhaust gases by the injector (which corresponds to that commanded by the system) and the amount of additive actually delivered by this injector. Therefore, it is ultimately a matter of ensuring that the decontamination system operates correctly without it being necessary to rely only on the information from the NOx sensor. Specifically, such a standard specifies a deviation less than a relative threshold, for example 25%, between the value of the liquid-additive flow rate theoretically commanded and the value of liquid additive actually consumed. In fact, it is not enough to provide means for injecting an exact amount of decontaminating additive into the flow of exhaust gas, it is also necessary to verify that this amount is actually injected.

The purpose of these regulations is to ensure that proper operation of the means for supplying the gas treatment system with liquid additive is permanently verified, in order that a warning can be signaled to the user in the event of a fault. It is also possible to limit or prevent the use of the vehicle when "clean" operation thereof (that is to say operation respecting the emission limits of polluting gases) is not guaranteed on account of a fault in the supply of liquid additive to the exhaust gas treatment system. Thus, if there is a leak of liquid additive and this causes a loss of liquid additive, above the threshold considered to be acceptable, corresponding information must be signaled to the user as soon as possible and preventative actions may optionally be taken as a consequence, in order to avoid impaired operation of the vehicle from the point of view of the treatment of the exhaust gases.

In order to be able to monitor the amount of liquid additive actually injected into the gas treatment system, a straightforward solution would be to use a flow meter placed at the inlet of the injector, in order to measure the amount of liquid additive actually consumed by the injector. However, this solution is not very compatible with the economic constraints of the automotive sector, given the cost of such a flow meter and the implementation thereof and the complexity associated with the mechanical and hydraulic installation thereof.

It is also conceivable to use as a basis, for the one part, the operating characteristic of the pump which defines the theoretical flow-rate values of the pump depending on the speed of operation thereof for a given pressure at the delivery outlet thereof and, for the other part, an injector operating characteristics table which defines the theoretical flow rate values of the injector depending on the opening command thereof for a given pressure of decontaminating liquid at the inlet of the injector.

Thus, for example, for an injector operating on the basis of an RDU ("reductant dosing unit") model, the injector alternates very quickly between completely open cycles and completely closed cycles, the respective durations of which set the mean flow rate of liquid at the outlet thereof. A theoretical flow rate delivered by such an injector depending on the control thereof is thus expected. Each injector thus, in general, has its theoretical operating characteristics (which link in particular the pressure, the opening times, the flow rate and optionally the temperature) combined within the operating characteristics table thereof.

In the same way, for a pump, for example a positive displacement gear pump, it is possible to determine in advance, on the basis of the operating characteristics table thereof, and for a given temperature of the liquid additive, the flow rate of liquid that it will generate depending on the speed of rotation of its drive motor.

However, the approach consisting in using the theoretical characteristics of the pump and of the injector to determine the flow rate of liquid additive delivered by the injector to the exhaust gas treatment system is limited. This is because, in practice, the effective flow rate values are linked to the temperature of the liquid additive, to the spread of characteristics of the components of the pump and of the injector, and to the aging thereof. For example, the performance aspects of the injector are not the same when it is new or used. Wear modifies the properties both of the pump and of the injector. In other words, although the theoretical characteristics of the pump and of the injector can make it possible to estimate a flow rate of liquid additive delivered to the system in a given period and under given circumstances, there is nothing to ensure the validity of such an estimation at another moment and under other circumstances.

The document DE102012218851 is known, which describes an operating process of a device for feeding reducing agent for an exhaust system, said feed device introducing an amount of reducing agent to be injected into a flow of exhaust gases by means of at least one injector. A simplified variation of the amount injected is possible if the amount of reducing agent returned by a distribution device that supplies the reducing agent to the injector is modified for changing and/or during the transfer of the amount injected.

Also known is the document DE102011075298, which relates to a pumping device for a metering system intended to inject a fluid into the exhaust circuit of an internal combustion engine, comprising a pump designed to deliver the fluid from a tank at increased pressure to a pressure line and a throttle which is connected hydraulically to the pressure line so as to allow the fluid to flow out of the pressure line. The throttle is controlled such that the amount of fluid discharged from the pressure pipe via the latter can be set by controlling the throttle.

Also known is the document WO2008006840, which relates to a system for storing an additive solution and injecting it into the exhaust gases of an internal combustion engine, this system comprising a tank for storing the additive and a rotary pump, a metering valve and an injector, which form a separate device, this system making it possible to meter and inject the additive solution into the exhaust gases as such without diluting it with a gas. In that system, the outlet pressure of the pump is regulated by adjusting the speed of rotation of the pump.

Finally, the document DE102016114862 is known, which relates to a reducing agent feed system for an exhaust post-treatment system. The reducing agent feed system may comprise a controller configured to receive an operating signal of the engine system and transmit a reducing agent dispensing signal in response to the operating signal of the engine system, an injector configured to dispense a reducing fluid into a flow of exhaust gas of the exhaust post-treatment system in response to the reducing agent dispensing signal, and a pump configured to operate between an off state and an on state in response to the reducing agent dispensing signal. Moreover, the reducing agent feed system may comprise a return line and a two-way valve, positioned in the return line and configured to operate between a closed position and an open position in response to the reducing agent dispensing signal.

SUMMARY OF THE INVENTION

The invention aims to eliminate, or at least mitigate, all or some of the aforementioned drawbacks of the prior art. It makes it possible to measure the flow rate of liquid additive actually delivered to the exhaust gas treatment system independently of the theoretical characteristics of the pump and of the injector.

To this end, a first aspect of the invention provides a process for the dynamic monitoring of the flow rate of a liquid additive consumed by a liquid-additive injector of an exhaust gas treatment system of a motor vehicle, said injector being able to spray the liquid additive into a flow of exhaust gas and to receive at its inlet the pressurized liquid additive via a hydraulic circuit that connects it to a liquid-additive tank and comprises a pump situated in a main path of the hydraulic circuit between the tank and the injector, said process comprising the following steps, executed by a control unit of the exhaust gas treatment system:

controlling the pump at a given operating speed to generate a first flow rate of liquid additive in the main path of the hydraulic circuit in the direction of the injector, measuring a pressure value by way of a pressure sensor arranged between the delivery outlet of the pump and the inlet of the injector, and directly in the vicinity of a calibrated orifice that is situated in a return path of the hydraulic circuit to the tank from the delivery outlet of the pump and bypassing the injector, determining a first flow rate of liquid additive from a pump operating characteristics table that defines the flow rate values of the pump depending on its operating speed for a given pressure at its delivery outlet;

determining a second flow rate of liquid additive circulating through the calibrated orifice from the measured pressure value; and calculating the flow rate of liquid additive consumed by the injector by subtracting the value of the second flow rate of liquid additive from the value of the first flow rate of liquid additive.

According to the invention, the process also comprises the following steps, executed by the control unit in a characterizing phase of the pump:

commanding the closure of the injector;

measuring, by way of the pressure sensor, at least two pressure values at the delivery outlet of the pump, said values being respectively obtained for at least two different operating speeds of the pump; and updating the pump operating characteristics table on the basis of the pressure values measured by the pressure sensor that correspond to the different operating speeds of the pump.

Embodiments, taken individually or in combination, further provide for:

the steps of the characterizing phase of the pump to be executed: each time the vehicle is started and/or as soon as a given time has elapsed since the vehicle was started, and/or as soon as a variation in temperature of the liquid additive greater than a given threshold is detected, and/or as soon as a given deviation with respect to a theoretical operating characteristic of the pump is detected.

the process also to comprise the following steps, executed by the control unit in a characterizing phase of the injector:

controlling the pump at a given operating speed to generate a given flow rate of liquid additive in the hydraulic circuit that is determined from the operating characteristic of the pump;

measuring, by way of the pressure sensor, at least two pressure values that are respectively obtained for at least two different commands for opening the injector; and updating an injector operating characteristics table, defining the flow rate values of the injector depending on its opening command for a given inlet pressure, on the basis of the flow rate value generated by the pump, the different commands for opening the injector and the corresponding pressure values measured by the sensor.

the steps of the characterizing phase of the injector to be executed: each time the vehicle is started and/or as soon as a given time has elapsed since the vehicle was started, and/or as soon as a variation in temperature of the liquid additive greater than a given threshold is detected.

the process also to comprise, in response to a request for a given flow rate of liquid additive to be injected into the flow of exhaust gas, produced by the control unit for the operation of the exhaust gas treatment system:

comparing the required flow rate and the flow rate value actually consumed by the injector, identified at the value of the flow rate of liquid additive calculated by implementing the steps of the process according to the first aspect; and outputting a warning if there is a deviation between the two values greater than a given relative threshold.

the return path of the hydraulic circuit also to comprise a valve preventing the circulation of the liquid additive in the direction from the tank to the injector.

the pump to be a two-way positive displacement gear pump, the flow rate of which is linked to the speed of rotation of a drive motor of the pump.

the dimensions of the calibrated orifice to be designed to avoid the closure of the orifice by contamination of the liquid additive with impurities, and also to ensure the flow of a turbulent flow through the orifice.

the hydraulic circuit also to comprise a filter for filtering the liquid additive at the outlet of the liquid additive tank.

According to a second aspect, a further subject of the invention is a control unit comprising means for implementing all the steps of the process according to the first aspect.

BRIEF DESCRIPTION OF THE DRAWINGS

Further features and advantages of the invention will become more apparent from reading the following description. This description is purely illustrative and should be read with reference to the appended drawings, in which:

FIG. 3 is a diagram of steps describing one embodiment of the process according to the invention;

FIG. 4 is a diagram of steps describing another embodiment of the process according to the invention.

DESCRIPTION OF THE PREFERRED EMBODIMENTS

Figure 1:
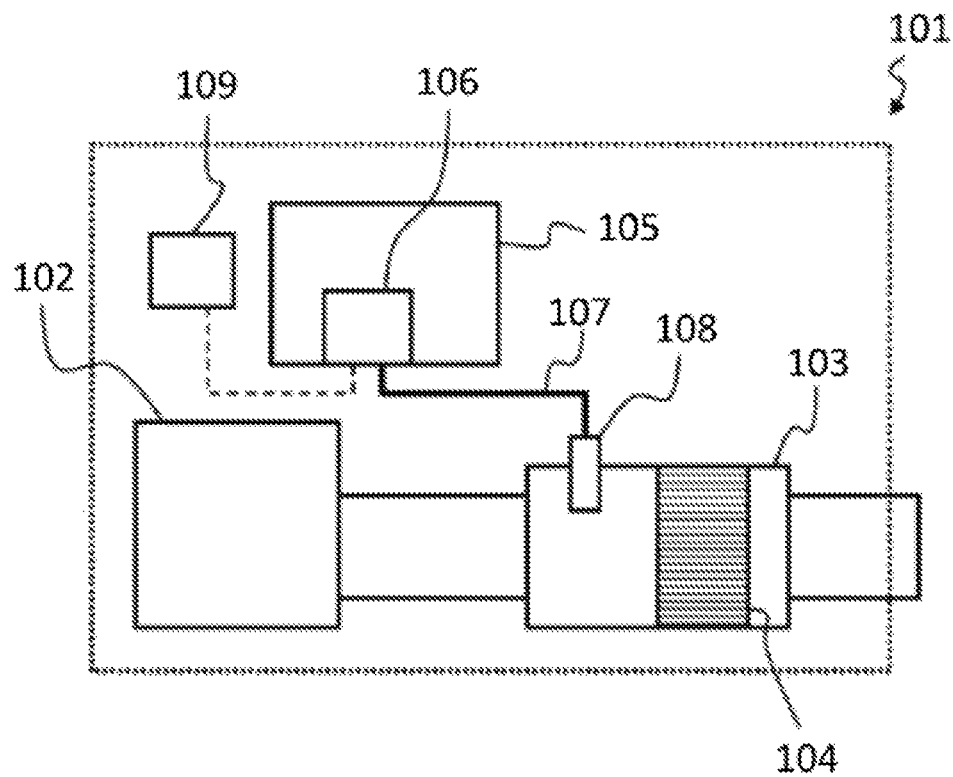
FIG. 1 is an operating diagram of a motor vehicle engine with an exhaust gas treatment device for reducing NOx.

In the following description of embodiments and in the figures of the appended drawings, identical elements or similar elements bear the same reference numerals.

FIG. 1 schematically shows a motor vehicle 101 having an internal combustion engine 102, for example a diesel engine. The motor vehicle 101 is for example a passenger car, a utility vehicle, a truck or a bus. The motor vehicle 101 also comprises an exhaust gas treatment system 103 having a catalytic converter 104 for implementing the SCR decontamination method. The vehicle 101 comprises a tank 105 for the liquid additive. The tank 105 is connected to an injector 108 for spraying the liquid additive into the gas treatment system 103, via a duct 107. The injector is fed with pressurized liquid additive by a pump which is integrated for example in a liquid-additive metering module 106 located at the tank.

When the engine 102 is in operation, it produces exhaust gases, and these gases are directed toward the exhaust gas treatment system 103. The exhaust gas treatment system 103 is fed with liquid additive by virtue of a hydraulic circuit formed by the pump integrated in the module 106, the duct 107 and the injector 108. The injector 108 sprays the decontaminating solution upstream of the catalytic converter 104 in order to bring about the selective catalytic reduction of the NOx by the SCR method. In this way, the decontamination of the exhaust gases is obtained.

The liquid additive is withdrawn and injected into the decontamination system only when this is necessary and only in an amount necessary for producing a reaction suited to the amount of exhaust gas produced at each moment by the engine 102 and to avoid injecting excessive additive, which is potentially responsible for surplus ammonia production and for needlessly consuming this additive.

All of the operations of metering the liquid additive and of controlling the pump are controlled by a control unit 109.

Figure 2:
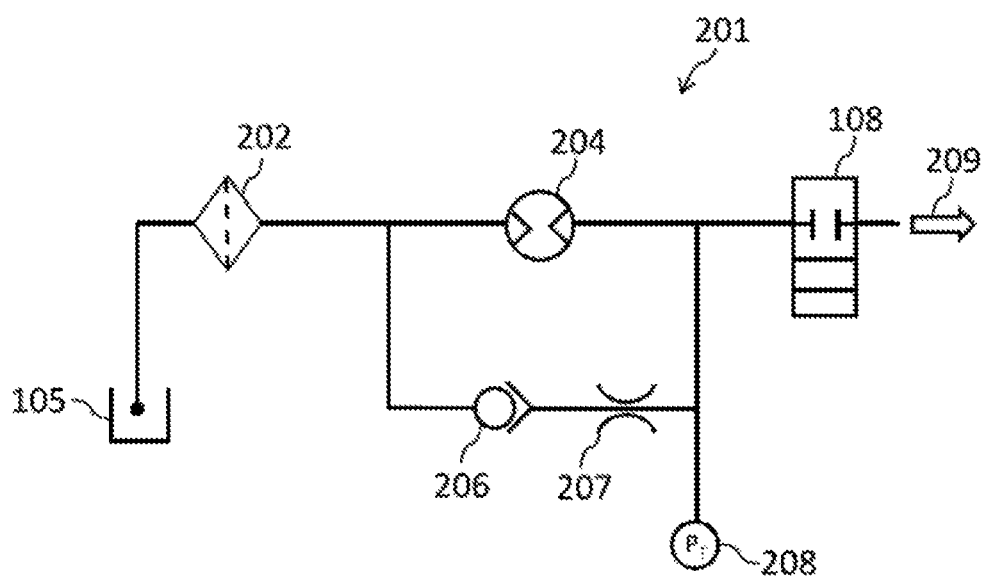
FIG. 2 is a schematic illustration of a hydraulic circuit for distributing liquid additive such as the one in which the process of the invention is carried out.

With reference to FIG. 2, an embodiment of a hydraulic circuit that carries out what was depicted schematically by the duct 107 in FIG. 1 will now be described. This hydraulic circuit, bearing the reference 201 in FIG. 2, has the function of conducting the liquid additive from the tank 105 in which the liquid is stored to the injector 108 that delivers it, in a sprayed form, to the exhaust gas treatment system or decontamination system (this system not being shown in FIG. 2).

The liquid additive, for example DEF sold under the trade name AdBlue®, is stored in the tank 105, from which it is withdrawn, at necessary times and in necessary amounts, in order to be injected into the flow of exhaust gases at the decontamination system. The liquid additive circulates in a main path of the hydraulic circuit 201 which connects the tank 105 to the injector 108, in this direction, and which comprises the pump 204. The injector 108 delivers, dynamically (that is to say in real time), the right amount of additive to the decontamination system. The arrow 209 shown on the right in FIG. 2 symbolizes this delivery.

The liquid additive is withdrawn from the tank 105 and driven through the main path of the circuit 201 at a certain flow rate via the pump 204. In certain embodiments, the pump may be a two-way pump, so as, in particular, to be able to purge the injector and the hydraulic circuit 201 if necessary. Furthermore, conventionally, the pump 204 that is used to carry out these functions may be a two-way positive displacement pump (or a semi-positive displacement pump), for example a positive displacement gear pump. The flow rate of liquid generated by such a pump is directly linked to the speed of rotation of the drive motor of the pump (measured in number of revolutions per minute) and is impacted relatively little by the delivery pressure. Advantageously, when this motor is an electronic commutation motor (also known as a brushless motor), the information relating to the speed of rotation of the motor is available and can be easily exploited depending on ways in which the process is implemented. Therefore, no specific sensor is necessary for obtaining this information. Furthermore, this type of motor is frequently used on account of its low cost. Moreover, in the different case of motors controlled by Hall effect sensors, the implementation of the process could also be based on absolute/digital reading of the inherent speed of rotation of this type of motor.

In a nonlimiting exemplary embodiment of the hydraulic circuit 201, the latter comprises a filter 202 which makes it possible to filter the liquid withdrawn from the tank 105 in order to limit the risk of contamination of the hydraulic circuit, of the injector 108 and/or of the gas treatment system 103 with impurities that may be contained in the tank 105.

The injector 108 may be of the RDU ("reductant dosing unit") type known to a person skilled in the art. As discussed in the introductory part of the present description, this type of injector has only two states, namely: completely open or completely closed. By contrast, the flow rate of liquid consumed by the injector 108 (that is to say sprayed into the flow of exhaust gas at the decontamination system 103) is controlled by the fact that alternating sequences, of respective relatively long or short durations, of opening and closure of the injector are commanded.

In the embodiment described, the monitoring of the flow rate is based in particular on the use of the orifice 207, of the pressure sensor 208 and of the valve 206. The orifice associated with the sensor makes it possible to indirectly measure the flow rate of additive in the hydraulic circuit. The valve 206 imposes a direction of circulation through the orifice, namely from the inlet of the injector 108 to the tank 105.

A person skilled in the art will also appreciate that the filter 202 is neither specific nor indispensable to the implementation of the process according to the invention.

The main advantage of the use of the orifice originates from the fact, if it is calibrated, meaning if its dimensions are known, that the flow rate passing through it can be directly deduced from the difference in pressure at its limits. The difference in pressure at the limits of the orifice is similar to that measured at its inlet from the point of view of the direction of the additive flow, since the pressure at the outlet of the orifice is similar to the return pressure to the tank, which may be negligible. Thus, from the pressure measured by the sensor 208, it is possible to directly deduce the flow rate of additive passing through the orifice 207. As will be seen in more detail below, it is then possible to deduce the flow rate actually delivered by the injector to the exhaust gas treatment system.

Specifically, if the dimensions of the orifice are known (and stable over time), a known function connects the change in the pressure at the inlet of the orifice to the flow rate of liquid passing through the orifice. In particular, the characteristic of the orifice may be measured perfectly at the factory and reported in the form of a digital table linking pressure and flow rate and stored in the one treatment unit.

A person skilled in the art will appreciate that, although the fact of measuring the pressure at the limits of the calibrated orifice 207 can make it possible to know the flow rate of the liquid passing through the latter, it is preferable for the flow of liquid passing through the orifice to be in a well-determined regime: laminar or turbulent. Specifically, determining the flow rate is valid for a laminar flow and for a turbulent flow, but the transition between these two regimes (typically for a Reynolds number of between 1500 and 3000) may result in erroneous estimation of the flow rate depending on the pressure measured.

In addition, in order not to be affected by the effects of viscosity and to allow the flow rate to be determined independently of the temperature, the dimensions may be chosen such that the flow passing through is always turbulent (that is to say with a Reynolds number greater than 3000) for the range of values of flow rates in question. Furthermore, a sufficiently large orifice makes it possible to avoid the potential contamination thereof with a particle.

Thus, a person skilled in the art may, for example, seek a compromise in the dimensions of the orifice: large enough to avoid contamination and minimize the effects of wear while remaining turbulent but without reaching dimensions that would bring about laminar flow through the orifice.

Finally, an important advantage of the process comes from the fact that this type of orifice is often already provided in the return path to the tank 105 from the outlet of the pump 204. Specifically, in the case for example of a positive displacement pump with a brushless motor, such an orifice in a return path to the tank makes it possible to stabilize the operation of the pump for a low flow rate consumed by the injector. Specifically, the motor drivers of this type of pump set a minimum speed of rotation of the motor so as to ensure a certain operational stability. Hence, the return path to the tank with an orifice of small caliber helps to ensure low values of the flow rate of additive injected, even for an operating speed of the pump above that which is necessary to obtain such a flow rate. It is for this reason that such a small caliber orifice is sometimes provided in the return path, without, however, being involved in any other function than that of stabilizing the pressure at the outlet of the pump for which it is provided. In addition, the presence of a pressure sensor is often associated systematically with this type of device. Specifically, it is generally necessary for controlling the injector.

As a result, the process according to the invention requires virtually no additional equipment to be able to allow the determination of the flow rate of liquid additive. In any event, the orifice and the pressure sensor represent a very low cost, in particular compared with the cost of a flow meter in the hydraulic circuit, which would be the standard solution to the problem set.

Advantageously, in another embodiment that is not shown, the return path directly links the valve 206 to the tank 105 without being connected to the main path downstream of the filter 202. In this way, the self-heating of the liquid by recirculation is minimized.

FIG. 3 is a diagram of steps illustrating ways of implementing the process.

The objective of the process is thus to be able to monitor, dynamically, since this changes constantly and sometimes abruptly, the flow rate of liquid additive consumed by the exhaust gas treatment system of a motor vehicle.

During step 301, the pump is commanded to operate at a given speed, making it possible to generate a chosen flow rate in the hydraulic circuit. The flow rate generated by the pump 204 is known by virtue of the characteristic of the pump, which is itself known. Specifically, this characteristic, in the form of an operating characteristics table, associates a generated flow rate of liquid additive with a given operating speed.

Step 302 is a step of measuring the pressure at the inlet of the orifice 207 and deducing, from measured pressure values, the flow rate of liquid additive passing through the orifice.

Finally, during step 303, the flow rate of liquid additive directly delivered to the gas treatment system is calculated by a simple subtraction operation carried out on the two determined values. By subtracting the value of the flow rate passing through the orifice from the flow rate generated by the pump, the flow rate of additive delivered to the decontamination system and symbolized by the arrow 209 in FIG. 2 is obtained.

Conventionally, the operations of providing liquid additive to the exhaust gas treatment system are controlled by a control unit of the ECU ("engine control unit") type, which requires a certain amount of liquid additive and regulates the flow rate of additive delivered to the gas treatment system over time by controlling both the pump and the injector.

In the example of the embodiment in FIG. 3, besides the control of the pump, the opening of the injector is also controlled by presupposing a given response to the control thereof. However, if the injector does not respond exactly as expected, for example on account of deterioration, the flow rate actually delivered to the gas treatment system is affected. It is for this reason that, by determining the flow rate that passes through the orifice, and is thus not delivered, the process takes into account, upon each measurement, any potential drift in the response of the injector to the control thereof and thus provides more precise information.

Since the pressure measurement by the sensor and the deduction of flow rate values therefrom are rapid, they therefore allow dynamic monitoring of the flow rate that is adapted to the rapid changes therein.

Finally, by virtue of the flow rate monitoring process, if the amount required by the control unit is not in line with that which is actually delivered, the control unit could signal a malfunction to the user of the vehicle (for example by an alarm) or even, if necessary, limit or prevent the operation of the engine. For example, by applying legally set rules relating to the operation of a decontamination system using the SCR method, if, for example, a deviation of more than 25% were to exist between the required value and the measured value of the flow rate delivered, the control unit could initiate an action following the detection of a system malfunction.

The diagram of steps in FIG. 4 illustrates another embodiment of the process according to the invention. In this embodiment, the objective of steps 401 to 403 is to allow calibration of the pump. More specifically, it is a matter of exactly determining the characteristic of the pump that associates a generated flow rate with an operating speed.

Thus, in the context of a hydraulic circuit such as the one described in FIG. 2, step 401 consists, firstly, in closing the injector 108. In this way, the entire flow rate generated by the pump circulates through the orifice 206.

Next, during step 402, the sensor, situated at the inlet of the orifice, measures several pressure values for different operating speeds of the pump. In order to be able to establish the characteristic of the pump, that is to say precisely know the function that makes it possible to link a generated flow rate to a given operating speed of the pump (for example a number of revolutions per minute for a positive displacement gear pump), a minimum of two measurement points, making it possible to reconstruct the curve associated with this function, is necessary. Thus, by measuring the pressure at the inlet of the orifice, the flow rate of liquid additive actually generated by the pump is deduced.

Finally, during step 403, the characteristic of the pump is updated, on the basis of the pressure values measured by the sensor.

This updating of the characteristic of the pump makes it possible to regularly ensure the reliability of the flow rate values of the pump depending on its operating speed for a given pressure at its delivery outlet. Thus, these values can be used, during steps 301 to 303, which are identical to those described in relation to the embodiment in FIG. 3, to be able to determine the flow rate of liquid additive actually delivered to the exhaust gas treatment system.

A person skilled in the art will appreciate that steps 401 to 403 can be carried out before and/or after steps 301 to 303 of the process, if it is considered useful to effect calibration of the pump. In this way, wear or deterioration of the pump, which are liable to cause a drift in these theoretical characteristics, can be taken into account and compensated as soon as necessary in order to optimize the determination of the flow rate of liquid additive.

Furthermore, to ensure the reliability of the data measured, all the abovementioned steps can be carried out when the vehicle is started but also after a given time has elapsed or for a significant change in temperature or as soon as an excessive deviation with respect to an expected theoretical operating characteristic of the pump is detected. In this way, knowledge of the actual parameters of the pump is ensured and the flow rate can be measured very regularly while remaining reliable. Calibration of the pump according to steps 401 to 403 of the process will last, for example, about one second, and could therefore be done regularly without jeopardizing the regular measurement of the flow rate of liquid additive delivered. In addition, it could be initiated by given driving conditions, for example immobilization of the vehicle for a certain time or, generally, when a condition indicates disrupted operation of the pump.

Figure 5:
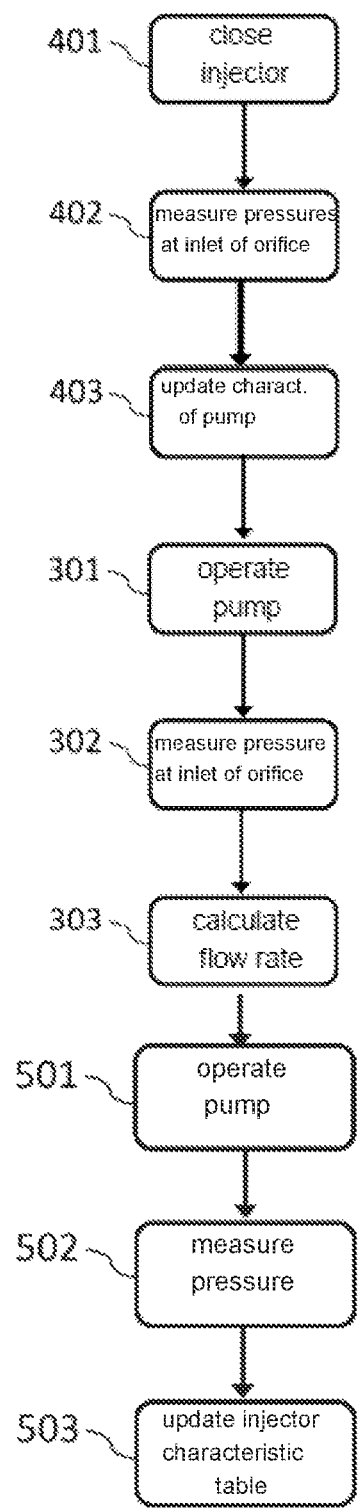
FIG. 5 is a diagram of steps describing another embodiment of the process according to the invention.

The diagram of steps in FIG. 5 illustrates yet another embodiment of the process according to the invention. In this embodiment, the objective of steps 501 to 503 is to allow calibration of the injector. Specifically, as described above, the opening and closure of the injector respond to a command requiring a rapid alternation of openings and closures that are respectively relatively long or short so as to create an expected "average" opening from the point of view of the liquid.

However, in the same way as for the pump, the response of the injector to a given command can be caused to change over time or the injector can suffer a malfunction causing it to operate very differently from these theoretical characteristics. It is for this reason that updating of these parameters may make it possible to more precisely effect proper control of the injector in order to obtain the flow rate of liquid additive delivered that is as close as possible to the required flow rate.

Thus, steps 501 to 503 can be carried out before and/or after steps 301 to 303 and 401 to 403 described with reference to the embodiments in FIGS. 3 and 4.

Step 501 consists in controlling the pump at a given operating speed to generate a desired flow rate of liquid additive in the hydraulic circuit on the basis of the operating characteristic of the pump.

Step 502 consists in measuring, with the pressure sensor, at least two pressure values (for the same reasons as those described above) obtained for at least two different commands for opening of the injector.

Finally, step 503 is the updating, on the basis of values obtained during step 502, an injector operating characteristics table which defines the theoretical flow rate values of the injector depending on the control thereof.

The present invention has been described and illustrated in the present detailed description and in the figures of the appended drawings. The present invention is not limited to the embodiments presented. Further variants and embodiments may be deduced and implemented by a person skilled in the art upon reading the present description and studying the drawings.

In the claims, the term "have" does not exclude other elements or other steps. A single processor or a plurality of other treatment units may be used to implement the invention. Likewise, a plurality of memories, potentially of different types, may be used to store and transfer information. The various features presented and/or claimed may advantageously be combined. Their presence in the description or in different dependent claims does not exclude this possibility. The reference signs should not be understood as limiting the scope of the invention.

The invention claimed is:

1. A process for dynamic monitoring of a flow rate of a liquid additive consumed by a liquid-additive injector of an exhaust gas treatment system of a motor vehicle, said injector being configured to spray the liquid additive into a flow of exhaust gas and to receive at an inlet of said injector the liquid additive via a hydraulic circuit that connects the injector to a liquid-additive tank, the hydraulic circuit including a pump disposed in a main path of the hydraulic circuit between the liquid-additive tank and the injector, said process, executed by a controller of the exhaust gas treatment system, comprising:

controlling the pump at a first specific operating speed to generate a first flow rate of the liquid additive in the main path of the hydraulic circuit in the direction of the injector;

measuring a pressure value, at an inlet of a calibrated orifice that is disposed in a return path of the hydraulic circuit to the liquid-additive tank from a delivery outlet of the pump and bypassing the injector when a valve in the return path imposes a direction of circulation of the liquid from the inlet of the injector through the calibrated orifice to the liquid additive tank, the pressure value being measured by a pressure sensor disposed between the delivery outlet of the pump and the inlet of the injector when the valve in the return path is open;

determining a first value of the first flow rate of the liquid additive from a pump-operating characteristics table that defines flow rate values of the pump depending on the first specific operating speed of the pump for a specific pressure at the delivery outlet of the pump;

determining a second value of a second flow rate of the liquid additive circulating through the calibrated orifice from the measured pressure value when the valve disposed in the return path is open;

calculating a third value of a third flow rate of the liquid additive consumed by the injector by subtracting the second value of the second flow rate of the liquid additive from the first value of the first flow rate of the liquid additive; and in a characterizing phase of the pump,
commanding a closure of the injector,
measuring, by the pressure sensor, at least two pressure values at the delivery outlet of the pump, said pressure values being respectively obtained for at least two different operating speeds of the pump, and
updating the pump-operating characteristics table based on the two pressure values measured by the pressure sensor that correspond to the two different operating speeds of the pump.

2. The process as claimed in claim 1, wherein the commanding the closure of the injector and the measuring, by the pressure sensor, the at least two pressure values at the delivery outlet of the pump are executed one or more of:
(i) each time the vehicle is started,
(ii) when a specific time has elapsed since the vehicle was started,
(iii) when a variation in temperature of the liquid additive greater than a specific threshold temperature is detected, and
(iv) when a deviation with respect to a theoretical operating characteristic of the pump is detected.

3. The process as claimed in claim 1, wherein the characterizing phase further comprises:
controlling the pump at a second specific operating speed to generate a specific flow rate of the liquid additive in the hydraulic circuit that is determined from the pump-operating characteristics table,
measuring, by the pressure sensor, at least two pressure values that are respectively obtained for at least two different commands to open the injector, and
updating an injector operating characteristics table, defining the flow rate values of the injector depending on an opening command for a specific inlet pressure, based on the value of the first flow rate, the different commands to open the injector and the corresponding pressure values measured by the sensor.

4. The process as claimed in claim 3, wherein the controlling the pump, the measuring the at least two pressure values at the delivery outlet of the pump, and the updating the pump-operating characteristics table of the characterizing phase are executed one or more of:
(i) each time the vehicle is started,
(ii) when a given time has elapsed since the vehicle was started, and
(iii) when a variation in temperature of the liquid additive greater than a specific threshold temperature is detected.

5. The process as claimed in claim 1, further comprising, in response to a request for a specific flow rate of the liquid additive to be injected into the flow of exhaust gas, produced by the controller for operation of the exhaust gas treatment system:
comparing the specific flow rate and a flow rate value actually consumed by the injector, identified at the value of the flow rate of the liquid additive consumed by the injector and calculated by implementing the process; and
outputting a warning when there is a deviation between the specific flow rate and the flow rate value actually consumed by the injector greater than a specific relative threshold.

6. The process as claimed in claim 1, wherein the return path of the hydraulic circuit comprises the valve preventing the circulating of the liquid additive in the direction from the liquid-additive tank to the injector.

7. The process as claimed in claim 1, wherein the pump is a two-way positive displacement gear pump, the flow rate of the pump being linked to a speed of rotation of a drive motor of the pump.

8. The process as claimed in claim 1, wherein dimensions of the calibrated orifice are configured to avoid a closure of the calibrated orifice by contamination of the liquid additive with impurities and to ensure the flow of a turbulent flow through the orifice.

9. The process as claimed in claim 1, wherein the hydraulic circuit further includes a filter configured to filter the liquid additive at an outlet of the liquid additive tank.

10. A controller comprising:
one or more processors configured to implement the process as claimed in claim 1.

11. The process as claimed in claim 2, wherein the characterizing phase of the pump further comprises:
controlling the pump at a second specific operating speed to generate a second specific flow rate of the liquid additive in the hydraulic circuit that is determined from the pump-operating characteristics table,
measuring, by the pressure sensor, at least two pressure values that are respectively obtained for at least two different commands to open the injector, and
updating an injector operating characteristics table, defining the flow rate values of the injector depending on an opening command for a specific inlet pressure, based on the value of the first flow rate, the different commands to open the injector and the corresponding pressure values measured by the sensor.

12. The process as claimed in claim 2, further comprising, in response to a request for a specific flow rate of the liquid additive to be injected into the flow of exhaust gas, produced by the controller for operation of the exhaust gas treatment system:
comparing the specific flow rate and a flow rate value actually consumed by the injector, identified at the value of the flow rate of the liquid additive consumed by the injector and calculated by implementing the process; and
outputting a warning when there is a deviation between the specific flow rate and the flow rate value actually consumed by the injector greater than a specific relative threshold.

13. The process as claimed in claim 3, further comprising, in response to a request for a specific flow rate of the liquid additive to be injected into the flow of exhaust gas, produced by the controller for operation of the exhaust gas treatment system:
comparing the specific flow rate and a flow rate value actually consumed by the injector, identified at the value of the flow rate of the liquid additive consumed by the injector and calculated by implementing the process; and
outputting a warning when there is a deviation between the specific flow rate and the flow rate value actually consumed by the injector greater than a specific relative threshold.

14. The process as claimed in claim 4, further comprising, in response to a request for a specific flow rate of the liquid additive to be injected into the flow of exhaust gas, produced by the controller for operation of the exhaust gas treatment system:
comparing the specific flow rate and a flow rate value actually consumed by the injector, identified at the value of the flow rate of the liquid additive consumed by the injector and calculated by implementing the process; and
outputting a warning when there is a deviation between the specific flow rate and the flow rate value actually consumed by the injector greater than a specific relative threshold.

15. The process as claimed in claim 2, wherein the return path of the hydraulic circuit comprises the valve preventing the circulating of the liquid additive in the direction from the liquid-additive tank to the injector.

16. The process as claimed in claim 3, wherein the return path of the hydraulic circuit comprises the valve preventing the circulating of the liquid additive in the direction from the liquid-additive tank to the injector.

17. The process as claimed in claim 4, wherein the return path of the hydraulic circuit comprises the valve preventing the circulating of the liquid additive in the direction from the liquid-additive tank to the injector.

18. The process as claimed in claim 5, wherein the return path of the hydraulic circuit comprises the valve preventing the circulating of the liquid additive in the direction from the liquid-additive tank to the injector.

19. The process as claimed in claim 2, wherein the pump is a two-way positive displacement gear pump, the flow rate of the pump being linked to a speed of rotation of a drive motor of the pump.

20. The process as claimed in claim 3, wherein the pump is a two-way positive displacement gear pump, the flow rate of the pump being linked to a speed of rotation of a drive motor of the pump.

* * * * *